March 23, 1965 P. F. SPREMULLI 3,174,919
METHODS FOR ELECTROLYZING GLASS
Filed Oct. 31, 1962
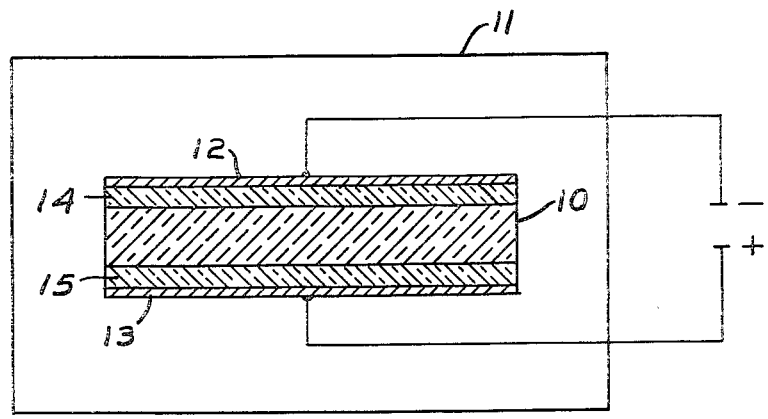
INVENTOR.
PAUL F. SPREMULLI
BY
Clarence R. Patty, Jr.
ATTORNEY United States Patent Office 3,174,919
Patented Mar. 23, 1965

3,174,919
METHODS FOR ELECTROLYZING GLASS
Paul F. Spremulli, Elmira, N.Y., assignor to Corning Glass Works, Corning, N.Y., a corporation of New York
Filed Oct. 31, 1962, Ser. No. 234,329
6 Claims. (Cl. 204—130)

The present invention relates to methods for altering the characteristics of solid materials by electrolysis and more particularly to a novel method for electrolyzing finished articles without the destruction or contamination of localized portions thereof.

It is well known that certain beneficial alterations in the properties of materials may be effected by means of electrolysis. Although electrolysis is generally associated with liquids, there are solid substances containing ions which are capable of migration and which render such substances amenable to electrolysis, particularly when maintained at elevated temperatures.

Although the improvement which comprises the present invention is applicable in all instances where solids are electrolyzed, the invention will be described with respect to its use in the electrolysis of finished articles of glass.

It is well known that the properties of glasses can be altered by electrolysis. Among the results achieved are a reduction in the tendency of certain glasses to darken when exposed to X-ray radiations, changes in the fluorescent properties of certain glasses, and the elimination of certain optical absorption bands, for example, the band at approximately 2450 A. found in vietreous silica. For a more detailed description of the process for electrolysis of a particular glass, reference is made to U.S. Patent 2,897,126, issued to H. George, and disclosing the electrolysis of vitreous silica.

It has been observed in the George patent that the electrolysis of glass produces a devitrified layer at the glass surface which contacts the cathode. Such devitrification is probably the result of the combined effects of heat, the electrical field, and attack by and accumulation of the positively charged ions which are drawn to the cathode. In addition to devitrification at the cathode, it has been found that marring of the surface occurs at the anodic face of glass articles during electrolysis. These effects present no problems if it is practical to remove the surface layers after electrolysis; however, it will be apparent that finished articles cannot satisfactorily be electrolyzed in their final shapes by this method.

It has also been observed by George that electrolyzed articles of vitreous silica cannot be remelted or reheated above 1400° C. without losing certain of the benefits provided by the electrolysis. Consequently, there is presented the dilemma that if such articles are not reheated and reshaped, it is often impossible to obtain desired shapes after the removal of the devitrified material, while if such reheating is undertaken, the benefits sought from electrolysis are lost.

Accordingly, it is an object of this invention to provide a method for electrolyzing solid materials without producing deterioration or composition changes of the portions of such materials in contact with the electrodes used in the process.

A further object is to permit the electrolysis of glass articles without devitrification or marring of the surfaces thereof.

These and other objects, which will be apparent from the description, are accomplished by interposing between the article being electrolyzed and the respective electrodes a buffer material which conducts ions of the type being removed by electrolysis.

The invention will be described with reference to the accompanying drawing which represents schematically in section one form of apparatus for electrolyzing a glass object without alteration of the surfaces thereof.

When a glass article is maintained at an elevated temperature and an electrical potential is applied across the article, there is a tendency for certain ions to migrate in directions parallel to the electrical field. For example, when glass article 10 is placed in furnace 11, and an electrical potential is imposed between platinum electrodes 12 and 13, alkali ions will migrate toward cathode 12, and oxygen ions will migrate toward anode 13. In the absence of buffer plates 14 and 15, there is a tendency for some alkali ions to collect in article 10 along its upper surface and for others to be volatilized and to attack the glass at that surface. The results are non-uniformity of composition and devitrification of the upper surface of the article. At the same time, oxygen evolved at the lower surface of the article causes marring of the surface.

It has been found that when substances which are conductive to the migrating ions are interposed between the article being electrolyzed and the respective electrodes, these surface alterations are avoided. The movement of the migrating ions is not interrupted at the faces of the article, but rather these ions continue their movement and are collected in the interposed substances. Thus, in the illustrated arrangement, alkali ions will collect in buffer plate 14, and oxygen will be evolved at the lower edge of buffer plate 15. Article 10 will remain homogeneous, and its surface characteristics will not be altered.

Although the invention is equally applicable in all instances where removal of ions from solids is effected by electrolysis, the process will be illustrated by the following example:

A glass article 10, approximately 1 inch square and ¼ inch thick, and having a composition by weight approximately 96.5% $SiO_2$, 3% $B_2O_3$, 0.5% $Al_2O_3$, with $Na_2O$ present as an impurity representing about 0.05% by weight, was electrolyzed as shown in the drawing. Buffer plates 14 and 15, each 1 inch square and ⅛ inch thick, were vitreous silica having a composition substantially 100% $SiO_2$, with trace amounts of impurities such as $Na_2O$. The article being electrolyzed had polished surfaces, while those of the buffer plates were finely ground. The glasses were heated to 1000° C. and a potential of 1500 volts was imposed across platinum electrodes 12 and 13 for 144 hours. No devitrification or marking of the surfaces of the article was observed. Electrolysis under identical conditions except for absence of the buffer plates produced the usual devitrification at the cathode and marred surface at the anode.

It is preferable to provide buffers with ground rather than polished surfaces in order to minimize the possibility of thermal sealing of the buffers to the article, although in most instances ground surfaces will not be necessary.

Since the benefits of the present invention accrue from the fact that migrating ions in the article being electrolyzed are caused to enter the buffer material rather than being released into the atmosphere or collected at the surfaces of the articles, it will be apparent that any material which offers a higher conductivity for ions of the types which are caused to migrate than does the electrode material will prevent the undesired effects to some degree. These undesired effects will be substantially eliminated if the buffer material has conductivities for these ions substantially as great as those of the article being electrolyzed. Accordingly, various buffer compositions satisfying the above conditions will perform satisfactorily, and in all instances, buffers having compositions substantially identical to those of the article will be satisfactory. The resistivity of a cathodic buffer material may be up to 500 times that of the article being electrolyzed and satisfactory results will be obtained, although as buffer plate resistivility increases, the time required for electrolysis increases. When the resistivity exceeds this amount, the migrating ions remain at the article-buffer interface before finally passing into the buffer for a length of time sufficient to produce devitrification at the surface.

It is to be understood that, although the invention has been illustrated by reference to a specific example involving the electrolysis of glass, the advantages of the invention are applicable in the electrolysis of all solids, for example, crystalline materials such as quartz. In the case of crystalline materials, devitrification is obviously not a problem; however, marring and non-homogeneity of composition are caused by the blocking of migrating ions by the electrodes. Electrolysis, according to the present invention, may be effected at all previously utilized temperatures and voltages, preferably with the exception of those which result in thermal sealing of the buffers to the articles and which can easily be determined experimentally for various compositions. Accordingly, it is intended that the scope of the present invention be limited not by the specific example given but rather only by the scope of the appended claims.

What is claimed is:

1. A process for removing ions from a glass body comprising the steps of
   maintaining said glass body in intimate contact with a discrete buffer material into which ions from said glass body can migrate,
   heating said glass body and said buffer material,
   applying a direct current voltage across said glass body and said buffer material to cause said ions to migrate from said glass body to said buffer material, and
   separating said glass body from said buffer material.

2. A process according to claim 1 in which said buffer material has a conductivity for said ions at least as high as the conductivity of said glass body for said ions.

3. A process according to claim 1 in which said buffer material comprises glass.

4. A process according to claim 3 in which said buffer material and said glass body have substantially identical compositions.

5. A process according to claim 3 in which the surface of said buffer material which contacts said glass body is a ground surface.

6. A process for removing ions from a glass body comprising the steps of
   maintaining said glass body between and in intimate contact with discrete rigid buffer materials into which ions of said glass body will migrate,
   heating said glass body and said buffer materials,
   applying a direct current voltage between said buffer materials whereby ions migrate from said glass body to the buffer materials, and
   separating the glass body from the buffer materials.

References Cited in the file of this patent

UNITED STATES PATENTS

| | | |
|---|---|---|
| 2,897,126 | George | July 28, 1959 |
| 2,927,042 | Hall et al. | Mar. 1, 1960 |

FOREIGN PATENTS

| | | |
|---|---|---|
| 1,016,416 | Germany | Sept. 26, 1957 |